US007615128B2

(12) United States Patent
Mikkelsen

(10) Patent No.: US 7,615,128 B2
(45) Date of Patent: Nov. 10, 2009

(54) METHOD AND APPARATUS FOR FRAY-FREE TEXTILE CUTTING

(75) Inventor: Steen B. Mikkelsen, Fontana, WI (US)

(73) Assignee: Mikkelsen Graphic Engineering, Inc., Lake Geneva, WI (US)

( * ) Notice: Subject to any disclaimer, the term of this patent is extended or adjusted under 35 U.S.C. 154(b) by 513 days.

(21) Appl. No.: 11/398,335

(22) Filed: Apr. 5, 2006

(65) Prior Publication Data

US 2007/0234861 A1 Oct. 11, 2007

(51) Int. Cl.
*B32B 37/00* (2006.01)

(52) U.S. Cl. .......................... 156/88; 156/64; 156/250; 156/354; 156/356; 156/510

(58) Field of Classification Search .................. 156/88, 156/250, 510, 64, 354, 356
See application file for complete search history.

(56) References Cited

U.S. PATENT DOCUMENTS 1,773,967 A 8/1930 Dreyfus
2,597,888 A * 5/1952 Miller ......................... 156/88
2,790,483 A 4/1957 Ederer et al.
3,106,502 A 10/1963 Starger et al.
3,243,330 A 3/1966 Zelnick
3,367,810 A 2/1968 Wasserstein
3,385,747 A 5/1968 Klein et al.
3,413,176 A 11/1968 Port et al.
3,486,957 A 12/1969 Fish et al.
3,510,379 A 5/1970 Heimberger
3,560,291 A 2/1971 Foglia et al.
3,594,261 A 7/1971 Broerman
3,668,028 A 6/1972 Short
3,731,648 A * 5/1973 Gerber et al. ................. 118/38
3,741,836 A 6/1973 Williams
3,790,744 A 2/1974 Bowen
3,805,650 A * 4/1974 Pearl ............................ 83/56
3,808,672 A 5/1974 Castro et al.
3,822,144 A 7/1974 Taylor
3,848,327 A 11/1974 Gerber et al.
3,852,144 A 12/1974 Parry
3,880,201 A 4/1975 Lee, Jr. et al.
3,931,491 A 1/1976 Stump
3,989,778 A 11/1976 Osborne
4,029,535 A 6/1977 Cannon et al.
4,158,762 A 6/1979 Saunders
4,261,285 A * 4/1981 Pearl ........................... 118/37
4,473,432 A 9/1984 Leader et al.
4,491,491 A 1/1985 Stumpf
4,496,407 A 1/1985 Lowery, Sr. et al.

(Continued)

FOREIGN PATENT DOCUMENTS

JP 8-158247 A * 6/1996

*Primary Examiner*—Jeff H Aftergut
(74) *Attorney, Agent, or Firm*—Jansson Shupe & Munger Ltd.

(57) ABSTRACT

A method and apparatus for fray-free cutting at the perimeter of an area of a textile sheet on a textile-receiving surface, including applying an anti-fray substance onto the sheet along a path at the perimeter by an anti-fray substance applicator movable along the surface as directed by a controller based on programmed information regarding the perimeter, and cutting the sheet at the perimeter by a cutter movable along the surface as directed by the controller based on the programmed information.

49 Claims, 7 Drawing Sheets

U.S. PATENT DOCUMENTS

| | | | | |
|---|---|---|---|---|
| 4,501,782 | A | | 2/1985 | Weatherly et al. |
| 4,534,819 | A | | 8/1985 | Payet et al. |
| 4,560,427 | A | | 12/1985 | Flood |
| 4,567,797 | A | | 2/1986 | Folk |
| 4,594,955 | A | | 6/1986 | Lichtenberg |
| 4,610,750 | A | | 9/1986 | Mango |
| 4,662,037 | A | | 5/1987 | Provost et al. |
| 4,685,363 | A | * | 8/1987 | Gerber .......................... 83/22 |
| 4,693,771 | A | | 9/1987 | Payet et al. |
| 4,699,678 | A | | 10/1987 | Mims |
| 4,800,872 | A | | 1/1989 | Buese et al. |
| 4,859,260 | A | | 8/1989 | Tice |
| 4,879,155 | A | | 11/1989 | Fujisawa |
| 5,001,208 | A | | 3/1991 | Roos et al. |
| 5,013,811 | A | | 5/1991 | Ross |
| 5,061,331 | A | | 10/1991 | Gute |
| 5,073,216 | A | | 12/1991 | Siegel et al. |
| 5,085,917 | A | | 2/1992 | Hodnett, IIII |
| 5,110,666 | A | | 5/1992 | Menzel et al. |
| 5,213,649 | A | | 5/1993 | Sepavich et al. |
| 5,219,636 | A | | 6/1993 | Golz |
| 5,258,211 | A | | 11/1993 | Momii et al. |
| 5,308,679 | A | | 5/1994 | Saito et al. |
| 5,403,644 | A | | 4/1995 | Fujisawa et al. |
| 5,447,589 | A | | 9/1995 | DeLangis |
| 5,538,280 | A | | 7/1996 | Gray et al. |
| 5,601,132 | A | | 2/1997 | Goodman |
| 5,614,115 | A | | 3/1997 | Horton et al. |
| 5,718,966 | A | | 2/1998 | Gray et al. |
| 5,783,623 | A | | 7/1998 | Skoufis et al. |
| 5,800,883 | A | | 9/1998 | Koseki |
| 5,932,041 | A | | 8/1999 | Dolling et al. |
| 5,981,034 | A | | 11/1999 | Gray et al. |
| 6,103,049 | A | | 8/2000 | Batdorf |
| 6,191,382 | B1 | | 2/2001 | Damikolas |
| 6,228,195 | B1 | | 5/2001 | Spatz et al. |
| 6,511,566 | B1 | | 1/2003 | Wessel et al. |
| 6,517,659 | B1 | | 2/2003 | VanderWerf et al. |
| 6,630,043 | B2 | | 10/2003 | Sloot |
| 6,681,668 | B1 | | 1/2004 | Smirle |
| 6,872,226 | B2 | | 3/2005 | Cali et al. |
| 2002/0017362 | A1 | | 2/2002 | Covert et al. |
| 2004/0224086 | A1 | | 11/2004 | Wright |
| 2005/0022920 | A1 | | 2/2005 | Fowler |
| 2005/0170151 | A1 | | 8/2005 | Dobson et al. |

* cited by examiner

METHOD AND APPARATUS FOR FRAY-FREE TEXTILE CUTTING

FIELD OF THE INVENTION

The invention is related generally to the field of textile processing technology and more particularly to fray-free cutting of textiles or the like for various purposes.

BACKGROUND OF THE INVENTION

Many textile materials of woven or non-woven nature tend to fray when cut into pieces or shapes and subsequently handled during various operations. It is highly desirable that the cutting of textiles be carried out in a manner preserving the cut edges from fraying or other similar degradation. Indeed, advantages of precision cutting tend to be lost due to fraying and other edge-related concerns.

The prior art includes a number of disclosures of applying liquid polymeric materials for purposes of avoiding textile fraying, or for piece-to-piece bonding purposes in which anti-fray capabilities of bonding agents are noted. Pertinent documents include U.S. Pat. No. 6,630,043 (Sloot), U.S. Pat. No. 5,601,132 (Goodman), U.S. Pat. No. 5,783,623 (Skoufis), U.S. Pat. No. 5,981,034 (Gray et al.), U.S. Pat. No. 5,718,966 (Gray et al.), U.S. Pat. No. 5,538,280 (Gray et al.), U.S. Pat. No. 5,085,917 (Hodnett) and U.S. Pat. No. 4,261,285 (Pearl), and United States Published Patent Applications 2005/0170151 (Dobson et al.) and 2002/0017362 (Covert et al.).

There remains a need for improved high-precision cutting apparatus and methods with textile-preserving anti-fray edge protection.

OBJECTS OF THE INVENTION

It is an object of the invention to provide fray-free cutting overcoming some of the problems and shortcomings of the prior art, including those referred to above.

Another object of the invention is to provide an anti-fray protection along and about the perimeter of a certain area to be cut out of a textile sheet.

Another object of the invention is to provide an anti-fray protection for the textile sheet by utilizing high-precision technology for anti-fray substance application.

Still another object of the invention is to provide anti-fray cutting apparatus and method which precisely places an anti-fray substance to achieve the desired protection.

How these and other objects are accomplished will become apparent from the following descriptions and the drawings.

SUMMARY OF THE INVENTION

The present invention provides an improved apparatus for fray-free cutting at the perimeter of an area of a textile sheet. The invention is also a method for fray-free cutting at the perimeter of an area of a textile sheet on a textile-receiving surface.

The apparatus includes a textile-receiving surface, a controller having programmed information regarding the perimeter of the area, a cutter movable with respect to the surface as directed by the controller to cut the sheet at the perimeter of the area, and an anti-fray substance applicator movable with respect to the surface as directed by the controller based on the programmed information to form an anti-fray path along the perimeter.

The textile-receiving surface is preferably substantially horizontal. The inventive apparatus may further include a vacuum structure adapted to retain the textile sheet in position on the textile-receiving surface. The inventive apparatus also preferably includes support structure secured with respect to the textile-receiving surface, with the anti-fray substance applicator being attached to the support structure for controlled movement along the textile-receiving surface.

In highly preferred embodiments the support structure includes a beam spanning the textile-receiving surface and reversibly movable therealong, and the applicator is reversibly movable along the beam. In some preferred embodiments the cutter is also attached to such beam and is reversibly movable therealong. The applicator and the cutter are preferably movable both with the beam (i.e., movement in the X-direction) and with respect to (along) the beam (i.e., movement in the Y-direction) in a manner providing independent concurrent movement thereof. In certain highly preferred embodiments of this type, for perimeter lines extending parallel to the direction of beam movement, the controller is further programmed for concurrent application by the applicator and cutting by the cutter with the applicator and the cutter in the same Y-position along the beam, thereby to increase productivity.

In a variant of embodiments involving concurrent application and cutting, the beam may include a main portion and an arm movably projecting from the main portion with the anti-fray substance applicator being disposed on the arm. In such variant the arm may have a telescopic configuration for moving the anti-fray substance applicator in a direction perpendicular to the beam.

In some embodiments involving a single beam, the applicator and the cutter may be interchangeably attached to the beam such that the applying and the cutting step require mounting of the appropriate device to the beam.

In some preferred embodiments a second beam spans the textile-receiving surface and is reversibly movable therealong independently of the other beam, the cutter being secured to and reversibly movable along the second beam, while the applicator is secured to and reversibly movable along the first beam. The anti-fray substance is preferably a liquid, with the applicator being a liquid-dispensing device. In certain embodiments the liquid-dispensing device is a liquid jet. In other embodiments the liquid-dispensing devices are air-brushes or rollers for contact with the textile sheet.

The anti-fray liquid it preferably applied prior to the cutting. However, in some situations applying and cutting can be carried out essentially at the same time, an example of which is mentioned below. In some situations the applying step can occur immediately after the cutting step, rather than before or at the same time. In certain embodiments in which the cutter is a rotary-blade, the applicator is positioned to apply a flow of anti-fray substance onto the rotary-blade such that the anti-fray substance is applied onto the sheet by the blade at the time of cutting.

The anti-fray substance preferably sets after penetration into the textile sheet. Most preferably, the liquid-dispensing device is adapted for dispensing the liquid to penetrate less than the full thickness of the textile sheet, whereby, after dispensing, the liquid does not reach the textile-receiving surface.

It is highly preferred that the liquid be a quick-setting liquid which, when set in the textile sheet, is also substantially transparent and non-glossy. The liquid is preferably a hotmelt composition selected to accommodate the nature of the textile material being cut and other specific requirements such as selected speeds, etc.

The liquid-dispensing device is preferably configured and arranged such that the path of applied liquid is no more than about 5 mm in width. In certain embodiments the position of the liquid-dispensing device is controlled such that the opposite edges of the path of applied liquid are preferably on opposite sides of the perimeter. The liquid-dispensing device position may be controlled such that the opposite edges of the path of applied substance are substantially parallel to and substantially equally spaced from the perimeter. In alternative embodiments the liquid-dispensing device position is controlled such that the path of applied liquid is inside the area and closely adjacent to the perimeter.

In certain embodiments of the invention the applicator is a preformed-strip dispenser, and the anti-fray substance is a preformed strip of textile-adherent material. The preformed-strip dispenser includes a carrier web from which the preformed strip is released when it adheres to the textile sheet.

One important aspect of this invention is that the programmed information includes information regarding specific graphic characteristics of the textile sheet and information regarding the perimeter of the area relative thereto. In such situations the apparatus further includes a sensor positioned to sense the specific (graphic or other) characteristics of the textile sheet, and the controller is configured to utilize sensed information and the programmed information to compensate for deviations of the sensed from the programmed information of the specific graphic characteristics. Most preferably, the specific graphic characteristics and the controller programming are such that the controller compensates for non-uniform distortions of the textile sheet.

In the present invention, the specific graphic characteristics may include registration marks at and/or around the perimeters of printed graphics on and to be cut from the textile material, the registration marks having been applied during the printing of graphics thereon. In some cases, however, the textiles will not include graphics or even registration marks thereon, and the information to be sensed may be sheet edges and/or other characteristics.

In certain alternative embodiments of this invention, an anti-fray instrument is utilized instead of the anti-fray substance applicator. Such anti-fray instrument may be a laser device configured and arranged to induce an anti-fray state in the textile by application of laser energy as directed by the controller based on the programmed information to form an anti-fray path along the perimeter of the area. Such laser device is preferably adapted for application of laser-energy having a focal point set to induce the anti-fray state of less than the full thickness of the textile sheet, whereby the anti-fray-induced portion of the textile does not touch the textile-receiving surface.

The laser device may be configured and arranged to apply laser energy onto the textile along the perimeter to thereafter be cut by a blade. In different embodiments the laser device is configured and arranged to apply laser energy onto a blade-cut edge immediately upon or after cutting. The laser device may be carried with the cutter.

The inventive method includes: applying an anti-fray substance onto the sheet along a path at the perimeter by an anti-fray substance applicator movable along the surface as directed by a controller based on programmed information regarding the perimeter; and cutting the sheet at the perimeter by a cutter movable along the surface as directed by the controller based on the programmed information.

In preferred embodiments of the method of this invention, the applying step is prior to the cutting step. In certain preferred examples of the method of this invention the cutting of the sheet commences while the applying step is still in progress on the sheet.

The preferred examples of the method include steps of automatically sensing the specific graphic characteristics, and utilization by the controller of sensed information and the programmed information to compensate for deviations of the sensed from the programmed information of the specific graphic characteristics. In some of such examples the specific graphic characteristics and the controller programming are such that the controller compensates for non-uniform distortions of the textile sheet.

The term "textile" as used herein means any kind of woven and non-woven cloth-like material, i.e., materials made by weaving, knitting or felting, etc. Such materials may be of natural, synthetic fibers or combination of both. This includes woven KEVLAR® fibers, fiberglass and variety of other materials.

The term "sheet" as used herein refers to materials that are in a roll, folded or in another form used for storage or transportation.

The phrase "penetrate less than the full thickness of the textile sheet" as used herein means that the anti-fray liquid composition enters the textile sheet to a depth of less than about 90% of the textile thickness. The controller may be programmed to regulate the amount of the dispensed liquid based on the textile surface characteristics, and the viscosity and setting time of the liquid. The liquid is preferably dispensed through a flow-rate-controlling mechanism chosen according to the characteristics of the textile and the liquid. The liquid is dispensed in an amount sufficient to form the anti-fray protection of the textile while avoiding adherence of the textile to the textile-receiving surface.

The term "closely adjacent" as used herein with reference to the path of applied anti-fray substance means very close to but not abutting the perimeter of the area; e.g., there may be about 1-3 mm between the path of applied liquid and the perimeter of the area.

DETAILED DESCRIPTION OF PREFERRED EMBODIMENTS

Figure 1:
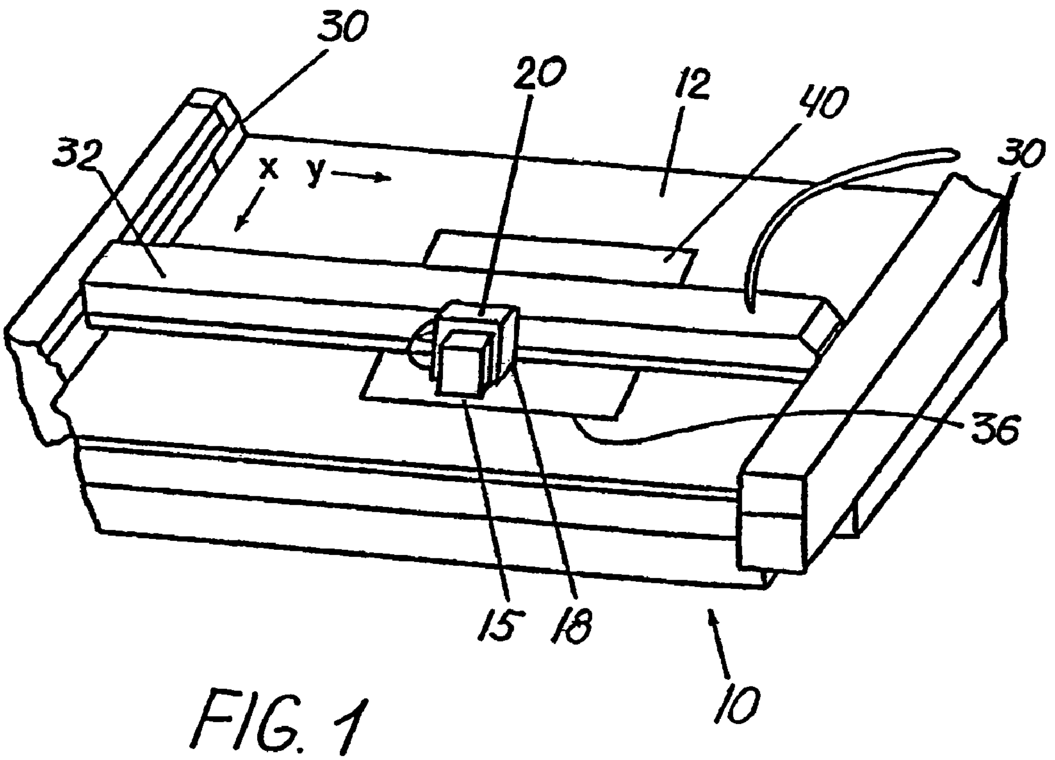
FIG. 1 is a perspective view of an apparatus employing the present invention with anti-fray substance applicator attached to a beam.
Figure 2:
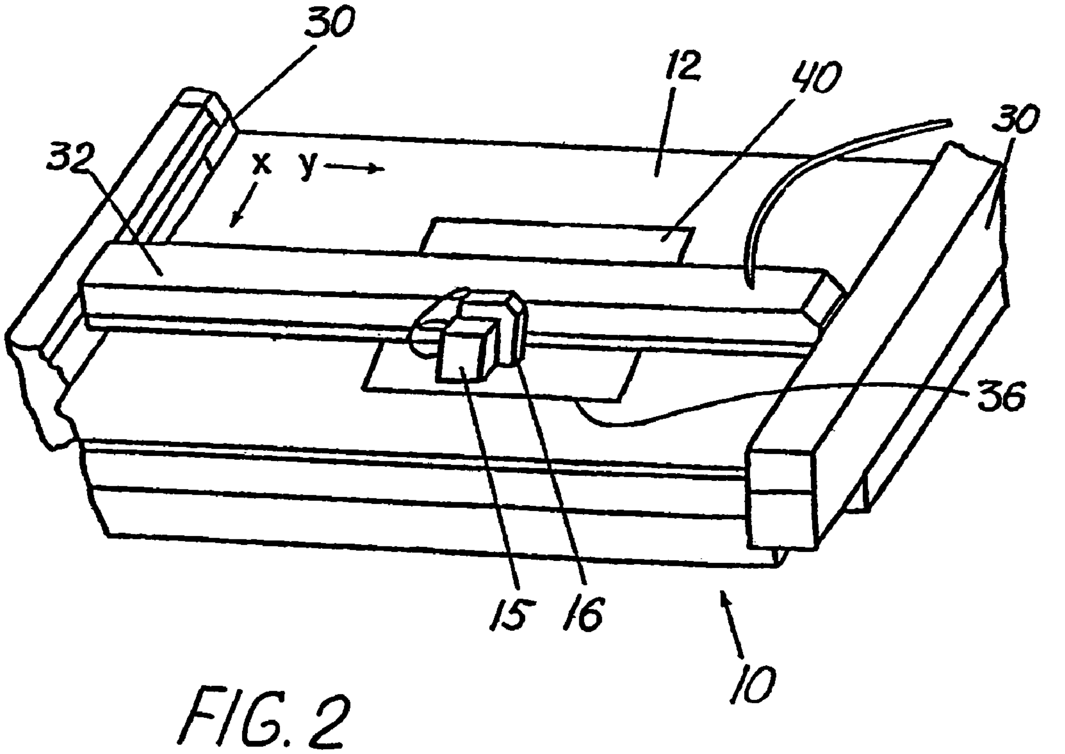
FIG. 2 is a perspective view of the apparatus of FIG. 1 with a cutter attached to the beam in place of the applicator.

Referring to FIGS. 1 and 2, fray-free cutting apparatus 10 includes a textile-receiving surface 12, a controller 14 having programmed information regarding perimeter 44 of an area 42, a cutter 16 movable with respect to surface 12 as directed by controller 14 to cut a textile sheet 40 at perimeter 44 of area 42, and an anti-fray substance applicator 18 movable with respect to surface 12 as directed by controller 14 based on the programmed information to form an anti-fray path 46 along perimeter 44. Apparatus 10 may further include a vacuum structure 36 adapted to retain textile sheet 40 in position on textile-receiving surface 12.

As shown in FIGS. 1-8 the fray-free apparatuses include support structure 30 secured with respect to textile-receiving surface 12. The anti-fray substance applicators are attached to support structure 30 for controlled movement along textile-receiving surface 12.

As best shown in FIG. 1, support structure 30 includes a beam 32 which spans textile-receiving surface 12 and is reversibly movable therealong, the anti-fray substance applicators being reversibly movable along beam 32.

In FIG. 2, cutter 16 is attached to beam 32 for reversible movement therealong in place of anti-fray substance applicator 18 shown in FIG. 1. Applicator 18 and cutter 16 are interchangeable for their respective purposes.

Figure 3:
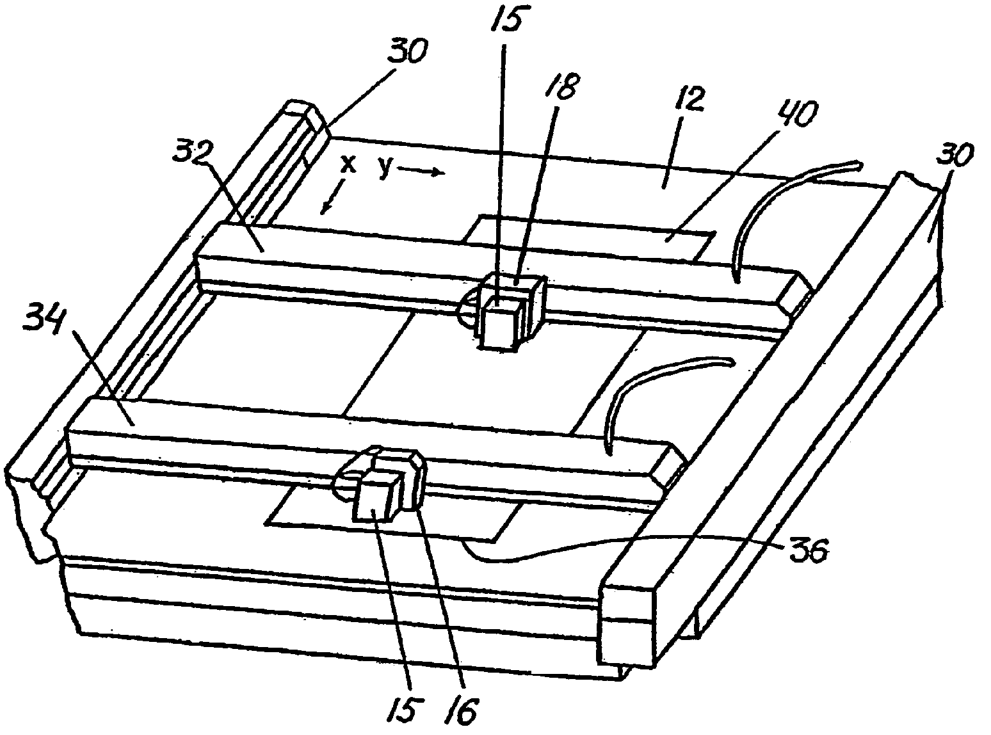
FIG. 3 is a perspective view of an apparatus having a first and a second beams with the applicator attached to the first beam and the cutter attached to the second beam.

FIG. 3 shows support structure 30 with a second beam 34 spanning textile-receiving surface 12 and reversibly movable therealong independent of beam 32. Cutter 16 is reversibly movable along second beam 34.

Figure 4:
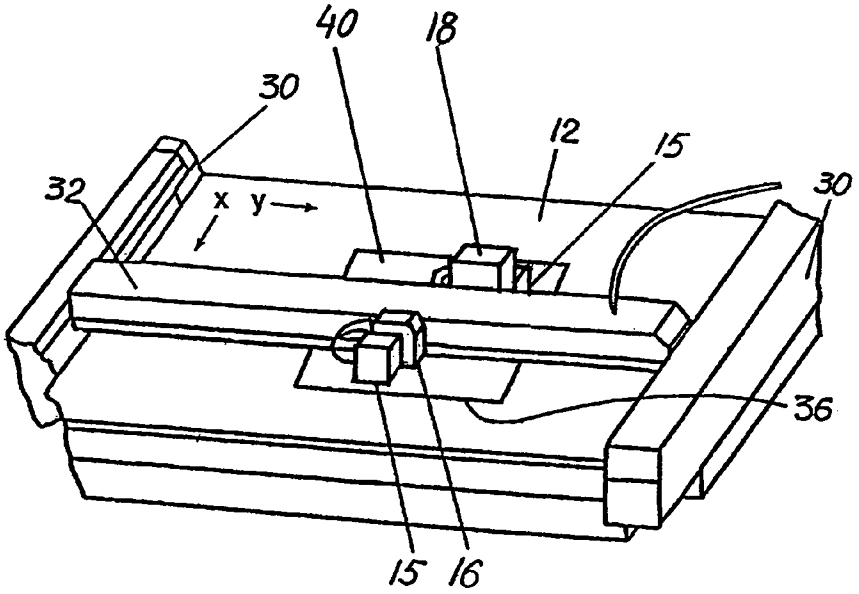
FIG. 4 is a perspective view of an apparatus with the applicator and the cutter both attached to the same beam.

FIG. 4 shows applicator 18 and cutter 16 both on beam 32, each being movable with and with respect to beam 32.

Figure 5:
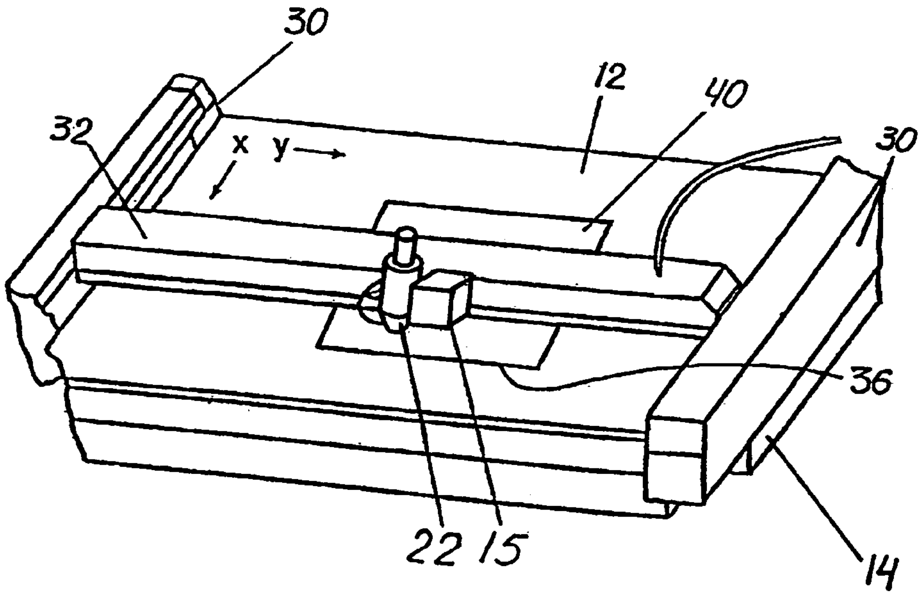
FIG. 5 is a perspective view of such apparatus in which the applicator is an airbrush.
Figure 6:
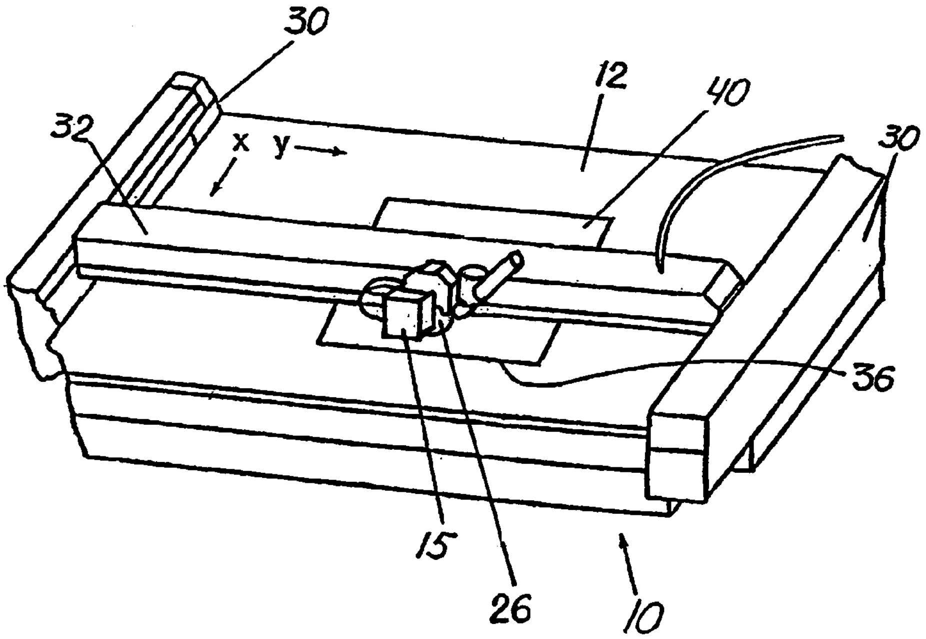
FIG. 6 is a perspective view of such apparatus in which the cutter is a rotary-blade.
Figure 7:
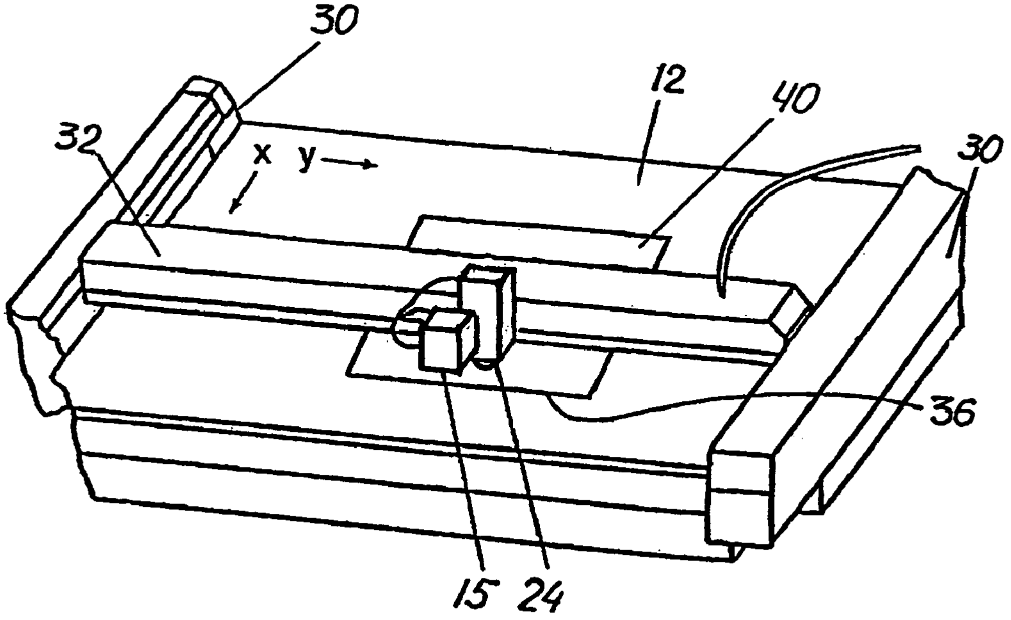
FIG. 7 is a perspective view of such apparatus in which the applicator is a roller.

In certain highly preferred embodiments, the anti-fray substance is a liquid. FIGS. 1 and 5-7 illustrate fray-free cutting apparatuses with applicators being liquid-dispensing devices. FIG. 1 shows liquid-dispensing device as a liquid jet 20. In FIG. 5, the liquid-dispensing device is an airbrush 22. In FIG. 7, the liquid-dispensing device is a roller 24 for contact with textile sheet 40. In FIG. 6, cutter 16 includes a rotary blade 26, and the anti-fray substance applicator provides a flows of the anti-fray liquid onto rotary blade 26 such that it is applied onto sheet 40 by blade 26 at the time of cutting.

Figure 8:
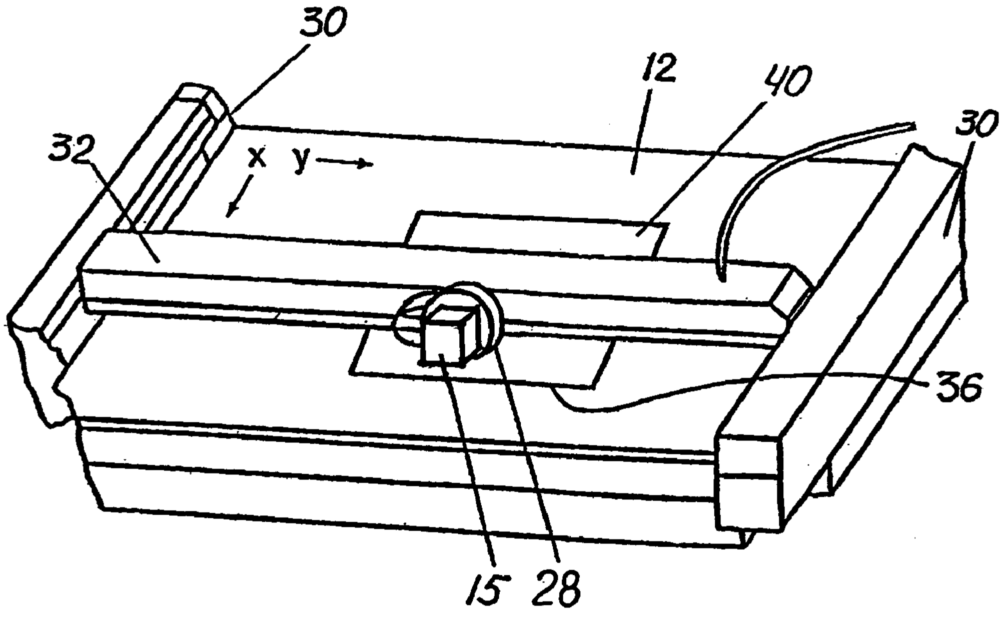
FIG. 8 is a perspective view of such apparatus in which the applicator is a preformed-strip dispenser.

FIG. 8 shows another aspects of the present invention in which the applicator is a preformed-strip dispenser 28.

Figure 9:
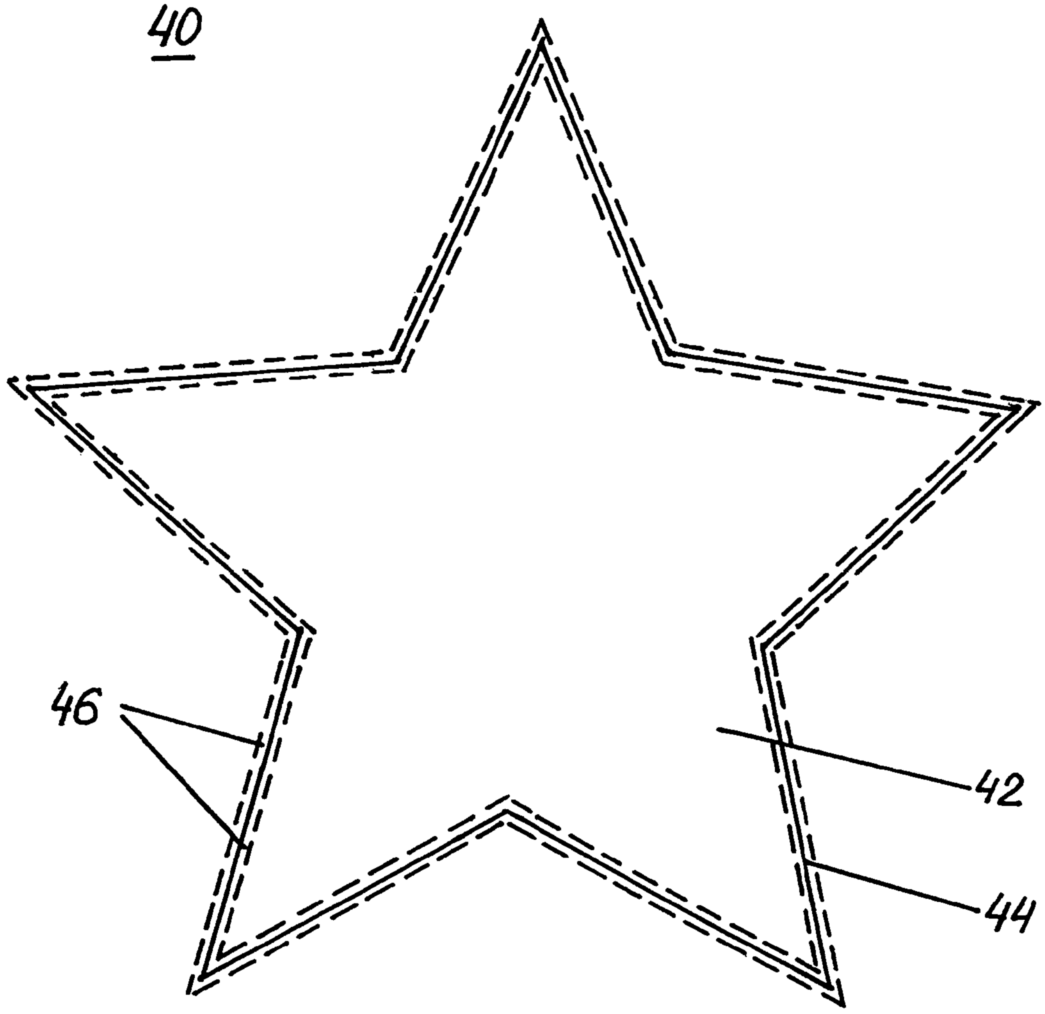
FIG. 9 is a plan view of an area on a textile sheet with an anti-fray path having its opposite edges on opposite sides of a perimeter of the area.
Figure 10:
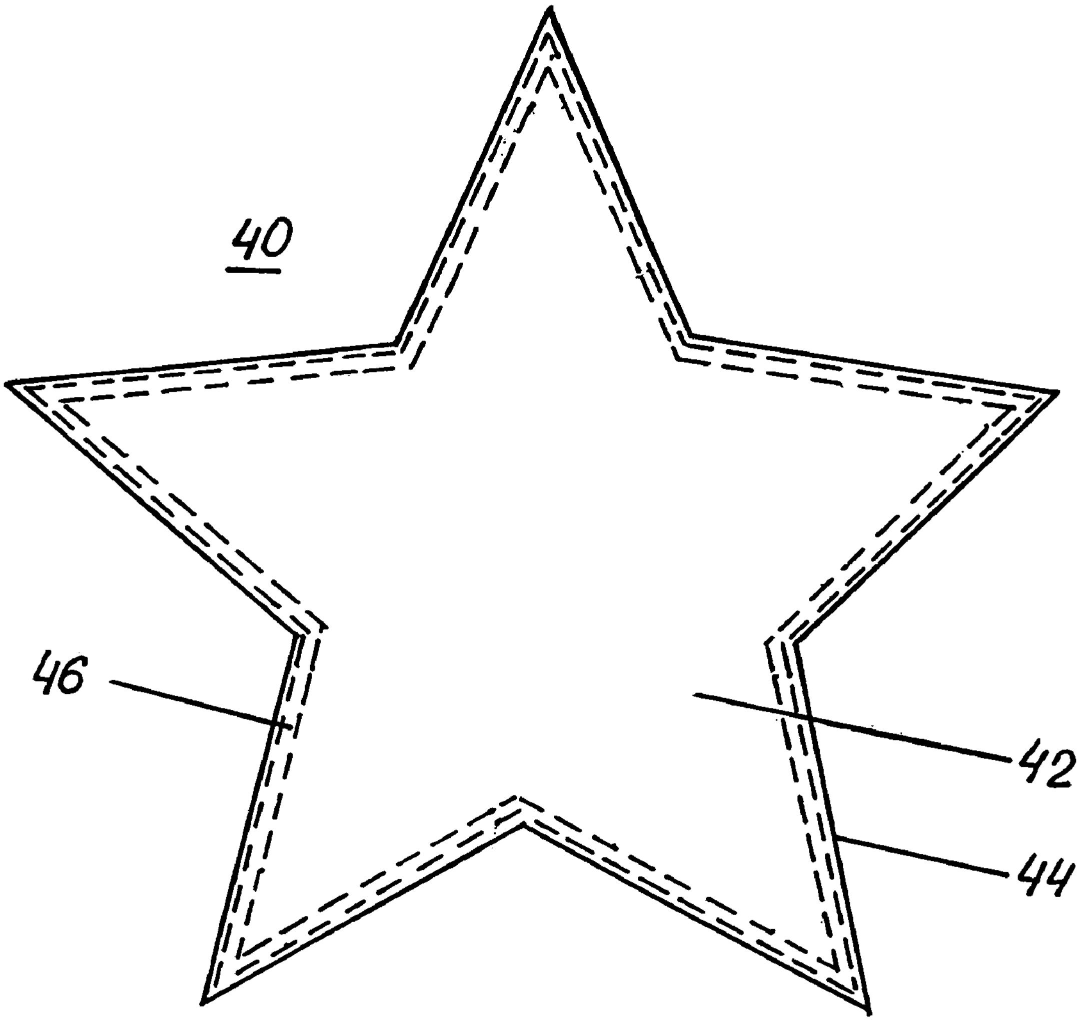
FIG. 10 is a plan view of an area on the textile sheet with the anti-fray path being inside the area and closely adjacent to the perimeter.

FIG. 9 illustrates a plan view of area 42 of textile sheet 40 with the opposite edges of path 46 of applied liquid are on opposite sides of perimeter 44, substantially parallel to and substantially equally spaced from perimeter 44. FIG. 10 shows path 46 of applied liquid inside area 42 and closely adjacent to perimeter 44.

Figure 11:
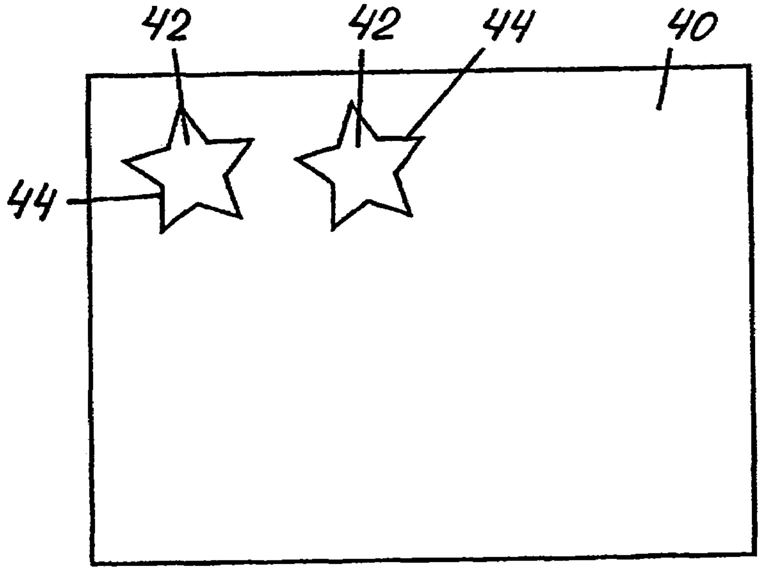
FIG. 11 is a plan view of the textile sheet showing an example where cutting is intended to occur.
Figure 12:
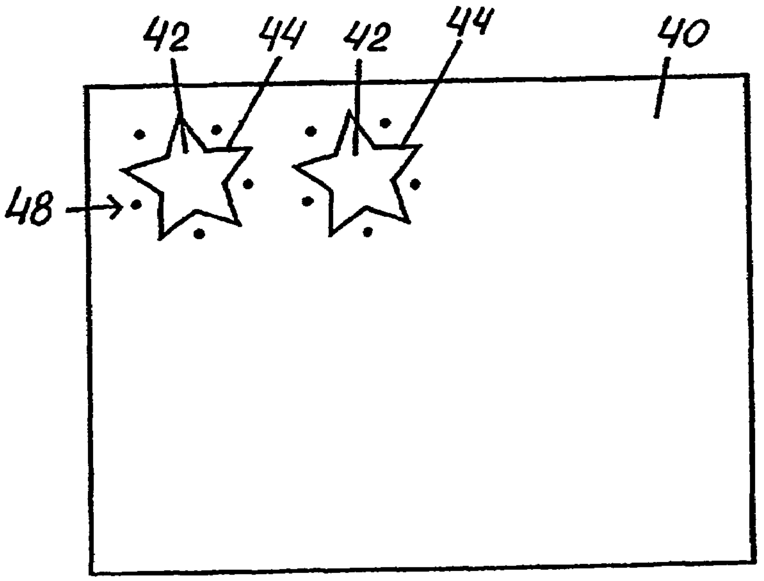
FIG. 12 is a plan view of the textile sheet showing graphic characteristics including registration marks about areas where cutting is intended to occur.

FIGS. 1-8 show a sensor 15 positioned to sense specific graphic characteristics of textile sheet 40. FIGS. 11 and 12 illustrate graphics along which cutting is intended, with FIG. 12 showing registration marks 48 at and around areas 42.

Precision cutting technology as set forth in various United States and other patents of Mikkelsen Graphic Engineering (MGE) of Lake Geneva, Wis. is applicable to the apparatus and method of this invention. The disclosures of MGE's U.S. Pat. No. 6,772,661 (Mikkelsen et al.), U.S. Pat. No. 6,619,167 (Mikkelsen et al.), U.S. Pat. No. 6,619,168 (Alsten et al.) and U.S. Pat. No. 6,672,187 (Alsten et al.), and United States Published Patent Application No. 2004/0083862 (Mikkelsen et al.) are incorporated herein by reference.

In preferred embodiments, the liquid anti-fray composition is a hotmelt composition selected to accommodate the nature of the textile material being cut. A wide variety of hotmelt compositions are available having different physical characteristics and qualities. Suitable hotmelts preferably are applied at a temperature of 150-200° C., have a softening point (Mettler) of 70-130° C. and a medium-fast set rate. They are preferably water-resistant, flexible when set, and stable under variable climate conditions. Preferably, the composition chosen will remain effective even after machine washing of the textiles. Suitable hotmelt materials would be apparent to those skilled in the art who are made familiar with this invention;

Hotmelt compositions typically include a base polymer and a polyolefin. Base polymers may be ethylene vinyl acetate copolymers, polyamides, polyesters, polyurethanes, etc. One highly preferred hotmelt for use in this invention is hotmelt 85000 available from Forbo Adhesives. Such material includes an ethylene vinyl acetate monomer, tackifying resin and paraffin wax. Suitable alternatives for use in various situations would be apparent to those skilled in the art.

While the cutter shown in the drawings is of the rotary-blade type, other types of cutters are also usable, such as regular tangential drag-blade cutters and oscillating tangential cutters. The preferred rotary-blade cutter is a motor-driven device with a spinning multi-edged round blade. The nature of the cutter is not an essential element of the invention.

While the principles of the invention have been shown and described in connection with specific embodiments, it is to be understood that such embodiments are by way of example and are not limiting.

The invention claimed is:

1. A method for fray-free cutting at the perimeter of an area of a textile sheet on a textile-receiving surface, comprising:

programming a controller, based on the viscosity and setting time of an anti-fray substance and the characteristics of the textile sheet, to regulate the amount of an anti-fray substance dispensed on the textile-sheet surface such that the substance penetrates less than the full thickness of the textile sheet and does not reach the textile-receiving surface, the controller having programmed information regarding the perimeter of the area;

applying the regulated amount of the anti-fray substance onto the sheet along a path at the perimeter by an anti-fray substance applicator movable along the surface as directed by the controller based on the programmed information; and cutting the sheet at the perimeter by a blade-type cutter movable along the surface as directed by the controller based on the programmed information.

2. The method of claim 1 wherein the applying step is prior to the cutting step.

3. The method of claim 2 wherein the cutting of the sheet commences while the applying step is still in progress on the sheet.

4. The method of claim 3 wherein the cutter and the applicator are carried by and independently movable along a beam which spans the textile-receiving surface and is reversibly movable therealong, and wherein, for perimeter lines extending parallel to the direction of beam movement, the controller is further programmed for concurrent application by the applicator and cutting by the cutter with the applicator and the cutter in the same Y-position along the beam, thereby to increase productivity.

5. The method of claim 1 wherein the anti-fray substance is a liquid.

6. The method of claim 5 wherein the liquid is applied using a liquid jet.

7. The method of claim 5 wherein the liquid is applied using an airbrush.

8. The method of claim 5 wherein the liquid is applied using a roller in contact with the textile sheet.

9. The method of claim 5 wherein the applying step is such that the anti-fray substance sets after penetration into the textile sheet.

10. The method of claim 5 wherein the liquid is a quick-setting liquid which, when set in the textile sheet, is substantially transparent and non-glossy.

11. The method of claim 10 wherein the liquid is a hotmelt composition.

12. The method of claim 5 wherein the anti-fray substance is applied such that the path of applied substance is no more than about 5 mm in width.

13. The method of claim 12 wherein the applying is such that the opposite edges of the path of applied substance are on opposite sides of the perimeter.

14. The method of claim 13 wherein the applicator position is controlled such that the opposite edges of the path of applied substance are substantially parallel to and substantially equally spaced from the perimeter.

15. The method of claim 12 wherein the applicator position is controlled such that the path of applied substance is inside the area and closely adjacent to the perimeter.

16. The method of claim 1 wherein the programmed information includes information regarding specific graphic characteristics of the textile sheet and information regarding the perimeter of the area relative thereto and further comprising:

automatically sensing the specific graphic characteristics; and utilization by the controller of sensed information and the programmed information to compensate for deviations of the sensed from the programmed information of the specific graphic characteristics.

17. The method of claim 16 wherein the specific graphic characteristics and the controller programming are such that the controller compensates for non-uniform distortions of the textile sheet.

18. The method of claim 16 wherein the specific graphic characteristics include registration marks at and/or around the area applied to the textile sheet at the time the perimeter of the area is defined.

19. In an apparatus for fray-free cutting at the perimeter of an area of a textile sheet, the apparatus being of the type having a textile-receiving surface, a blade-type cutter movable with respect to the textile-receiving surface to cut the textile sheet at the perimeter of the area, a separate anti-fray substance applicator movable with respect to the textile-receiving surface to form an anti-fray path along the perimeter, and a controller having programmed information regarding the perimeter of the area for directing the cutter and the applicator, the improvement comprising the controller being programmed, based on viscosity and setting time of the substance and the characteristics of the textile sheet, to regulate the amount of the anti-fray substance dispensed on the textile top surface such that the substance penetrates less than the full thickness of the textile sheet and does not reach the textile-receiving surface.

20. The apparatus of claim 19 wherein:

support structure is secured with respect to the textile-receiving surface; and the applicator is attached to the support structure for controlled movement along the textile-receiving surface.

21. The apparatus of claim 20 wherein:

the support structure includes a beam spanning the textile-receiving surface and reversibly movable therealong; and the applicator and the cutter are movable both with and with respect to the beam in a manner providing independent concurrent movement thereof.

22. The apparatus of claim 21 wherein, for perimeter lines extending parallel to the direction of beam movement, the controller is further programmed for concurrent application by the applicator and cutting by the cutter with the applicator and the cutter in the same Y-position along the beam, thereby to increase productivity.

23. The apparatus of claim 20 wherein:

the support structure includes a beam spanning the textile-receiving surface and reversibly movable therealong; and the applicator is reversibly movable along the beam.

24. The apparatus of claim 23 wherein the cutter is attached to the beam and is reversibly movable therealong.

25. The apparatus of claim 23 wherein:

the support structure includes a second beam spanning the textile-receiving surface and reversibly movable therealong independently of the other beam; and the cutter is reversibly movable along the second beam.

26. The apparatus of claim 19 wherein:

the anti-fray substance is a liquid; and the applicator is a liquid-dispensing device.

27. The apparatus of claim 26 wherein the liquid-dispensing device comprises a liquid jet.

28. The apparatus of claim 26 wherein the liquid-dispensing device comprises an airbrush.

29. The apparatus of claim 26 wherein the liquid-dispensing device comprises a roller for contact with the textile sheet.

30. The apparatus of claim 26 wherein the anti-fray substance sets after penetration into the textile sheet.

31. The apparatus of claim 26 wherein the liquid is a quick-setting liquid which, when set in the textile sheet, is substantially transparent and non-glossy.

32. The apparatus of claim 31 wherein the liquid is a hotmelt composition.

33. The apparatus of claim 26 wherein the liquid-dispensing device is configured and arranged such that the path of applied liquid is no more than about 5 mm in width.

34. The apparatus of claim 33 wherein the liquid-dispensing device position is controlled such that the opposite edges of the path of applied liquid are on opposite sides of the perimeter.

35. The apparatus of claim 34 wherein the liquid-dispensing device position is controlled such that the opposite edges of the path of applied substance are substantially parallel to and substantially equally spaced from the perimeter.

36. The apparatus of claim 33 wherein the liquid-dispensing device position is controlled such that the path of applied liquid is inside the area and closely adjacent to the perimeter.

37. The apparatus of claim 19 wherein the textile-receiving surface is substantially horizontal.

38. The apparatus of claim 19 further comprising a vacuum structure adapted to retain the textile sheet in position on the textile-receiving surface.

39. The apparatus of claim 19 wherein:

the programmed information includes information regarding specific graphic characteristics of the textile sheet and information regarding the perimeter of the area relative thereto;

the apparatus further includes a sensor positioned to sense the specific graphic characteristics of the textile sheet; and the controller is configured to utilize sensed information and the programmed information to compensate for deviations of the sensed from the programmed information of the specific graphic characteristics.

40. The apparatus of claim 39 wherein the specific graphic characteristics and the controller programming are such that the controller compensates for non-uniform distortions of the textile sheet.

41. The apparatus of claim 39 wherein the specific graphic characteristics include registration marks at and/or around the area applied to the textile sheet at the time the perimeter of the area is defined.

42. The apparatus of claim 39 wherein:

the anti-fray substance is a liquid; and the applicator is a liquid-dispensing device.

43. The apparatus of claim 42 wherein the liquid-dispensing device comprises a liquid jet.

44. The apparatus of claim 42 wherein the liquid-dispensing device comprises an airbrush.

45. The apparatus of claim 42 wherein the liquid-dispensing device comprises a roller for contact with the textile sheet.

46. The apparatus of claim 42 wherein the anti-fray substance sets after penetration into the textile sheet.

47. The apparatus of claim 42 wherein the liquid is a quick-setting liquid which, when set in the textile sheet, is substantially transparent and non-glossy.

48. The apparatus of claim 47 wherein the liquid is a hotmelt composition.

49. Apparatus for fray-free cutting at the perimeter of an area of a textile sheet, the apparatus being of the type having a textile-receiving surface, a blade-type cutter movable with respect to the surface to cut the textile sheet at the perimeter of the area, a separate anti-fray instrument movable with respect to the surface to induce an anti-fray state along the perimeter, and a controller having programmed information regarding the perimeter of the area for directing the cutter and the anti-fray instrument, the improvement comprising the controller being programmed to induce the anti-fray state in less than the full thickness of the textile sheet such that the anti-fray state does not reach the textile-receiving surface and material adherence to the textile-receiving surface is thereby avoided.

* * * * *